US007894311B2

(12) United States Patent
Yoneda et al.

(10) Patent No.: US 7,894,311 B2
(45) Date of Patent: Feb. 22, 2011

(54) FOCUS SERVO APPARATUS

(75) Inventors: Jin Yoneda, Gunma (JP); Akira Yoshida, Gunma (JP); Hideaki Sekiya, Tokyo (JP)

(73) Assignees: Sanyo Electric Co., Ltd., Osaka (JP); Sanyo Semiconductor Co., Ltd., Gunma (JP)

( * ) Notice: Subject to any disclaimer, the term of this patent is extended or adjusted under 35 U.S.C. 154(b) by 718 days.

(21) Appl. No.: 11/832,575

(22) Filed: Aug. 1, 2007

(65) Prior Publication Data

US 2008/0037381 A1 Feb. 14, 2008

(30) Foreign Application Priority Data

Aug. 8, 2006 (JP) .............................. 2006-216151

(51) Int. Cl.
*G11B 7/00* (2006.01)
*G11B 7/09* (2006.01)
(52) U.S. Cl. .............. 369/44.26; 369/53.22; 369/44.25; 369/47.4; 369/53.19; 369/94
(58) Field of Classification Search ............. 369/44.11, 369/44.29, 44.26, 53.22, 94, 44.25, 44.27, 369/44.41, 47.4, 1, 53.19
See application file for complete search history.

(56) References Cited

U.S. PATENT DOCUMENTS

| 5,751,674 | A | 5/1998 | Bradshaw et al. |
| 7,054,240 | B2 * | 5/2006 | Song et al. ............... 369/44.29 |
| 2003/0067850 | A1 | 4/2003 | Takahashi et al. |
| 2004/0027937 | A1 * | 2/2004 | Han ....................... 369/44.29 |
| 2004/0130980 | A1 | 7/2004 | Kelbas et al. |

FOREIGN PATENT DOCUMENTS

| EP | 1 777 703 A2 | 10/2006 |
| JP | 5-55310 | 7/1993 |
| JP | 09-115147 | 2/1997 |
| WO | WO 90/11599 | 10/1990 |

OTHER PUBLICATIONS

European Search Report, 7 pages, dated Nov. 14, 2007.

* cited by examiner

*Primary Examiner*—Wayne R Young
*Assistant Examiner*—Dionne H Pendleton
(74) *Attorney, Agent, or Firm*—Fish & Richardson P.C.

(57) ABSTRACT

A focus servo apparatus for an optical disc apparatus including an objective lens to converge laser beam on an information recording surface of an optical disc, and an actuator to move the objective lens in a focusing direction crossing the information recording surface, the focus servo apparatus comprising: a retaining unit configured to retain control data for driving the actuator; and a setting unit configured to set the control data retained by the retaining unit as initial data for driving the actuator, in the case of driving the actuator, to detect a position of the objective lens where the laser beam is focused on the information recording surface, as a target position when performing focus servo.

3 Claims, 7 Drawing Sheets

FOCUS SERVO APPARATUS

CROSS-REFERENCE TO RELATED APPLICATION

This application claims the benefit of priority to Japanese Patent Application No. 2006-216151, filed Aug. 8, 2006, of which full contents are incorporated herein by reference.

BACKGROUND OF THE INVENTION

1. Field of the Invention

The present invention relates to a focus servo apparatus.

2. Description of the Related Art

Currently, an optical disc apparatus for reproducing or recording information from or into an optical disc (CD (Compact Disc), DVD (Digital Versatile Disc), etc.) is widely used. While reproducing or recording information from or into an optical disc, the optical disc apparatus performs focus servo to move an objective lens that converges laser beam, in a focusing direction orthogonal to an information recording surface, in order to focus laser beam on the information recording surface of the optical disc in response to the wobbling or the like thereof. In order to set the target position of the objective lens in the focusing direction when performing the focus servo, the optical disc apparatus executes the so-called focus search to detect the objective lens position at which laser beam is focused on the information recording surface, as an initial operation based on the turning-on of a power supply voltage, for example.

Figure 5:
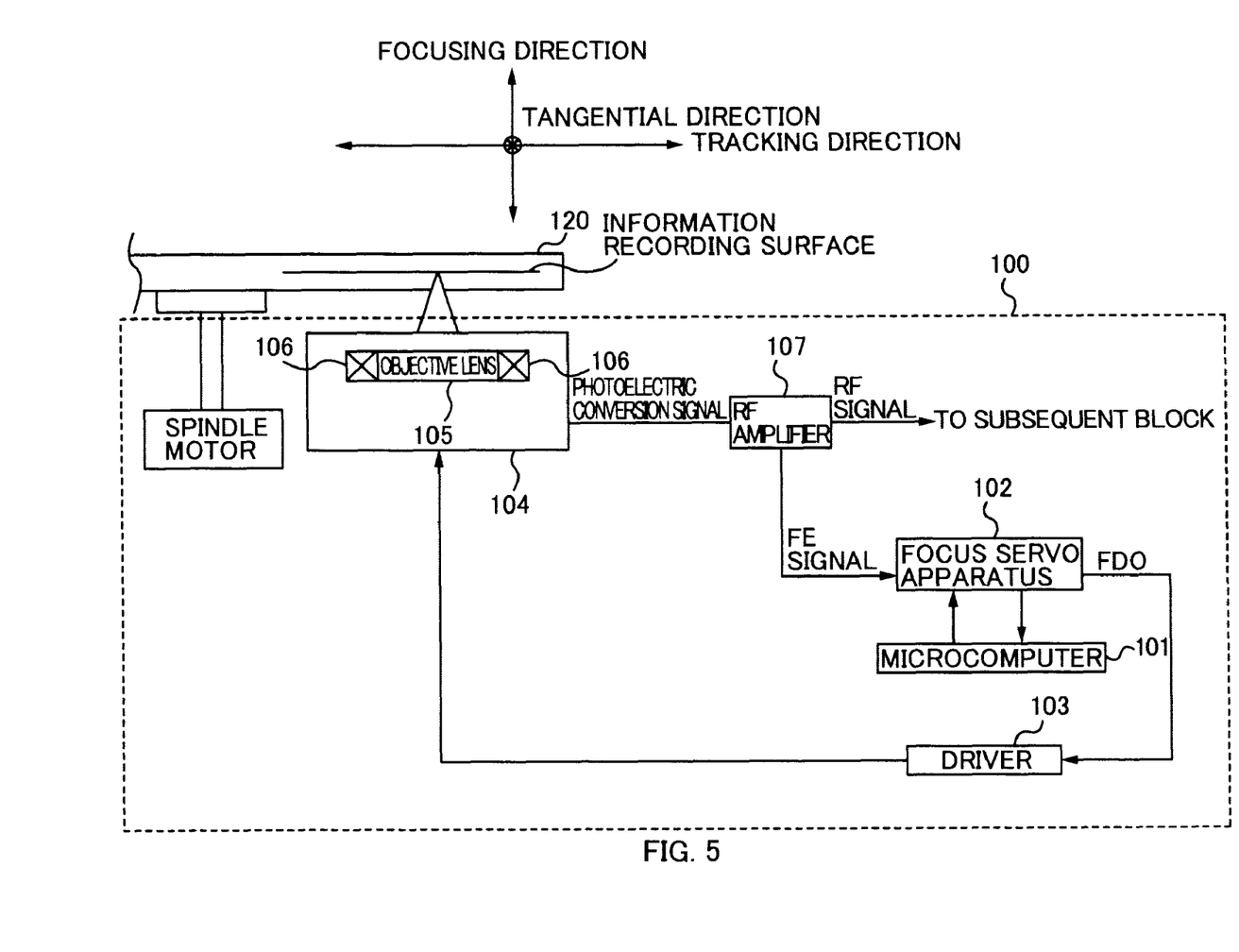
FIG. 5 is a block diagram illustrating a configuration of an optical disc apparatus.
Figure 6:
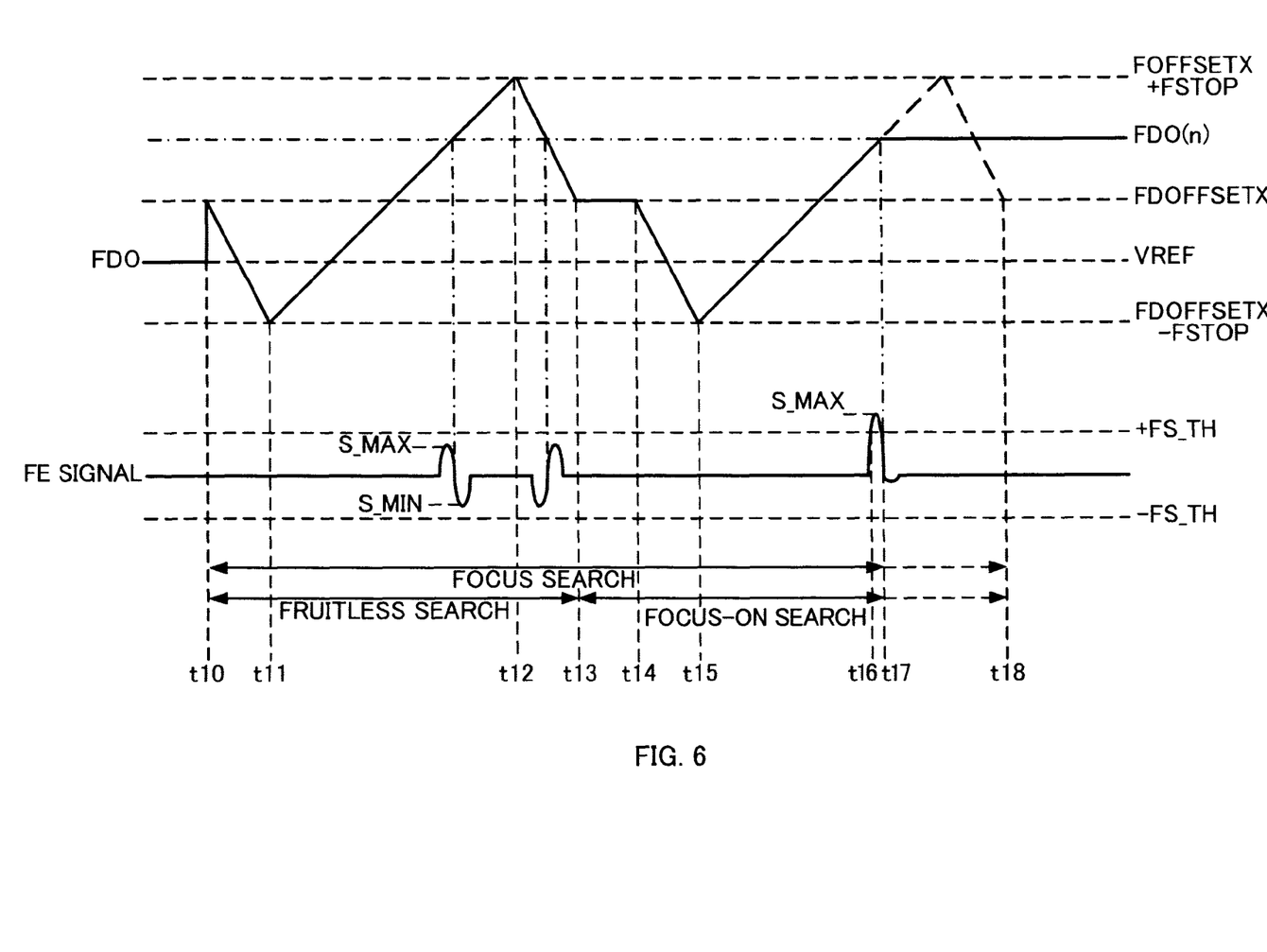
FIG. 6 is a waveform diagram showing waveforms of an FE signal and an output signal FDO.
Figure 7:
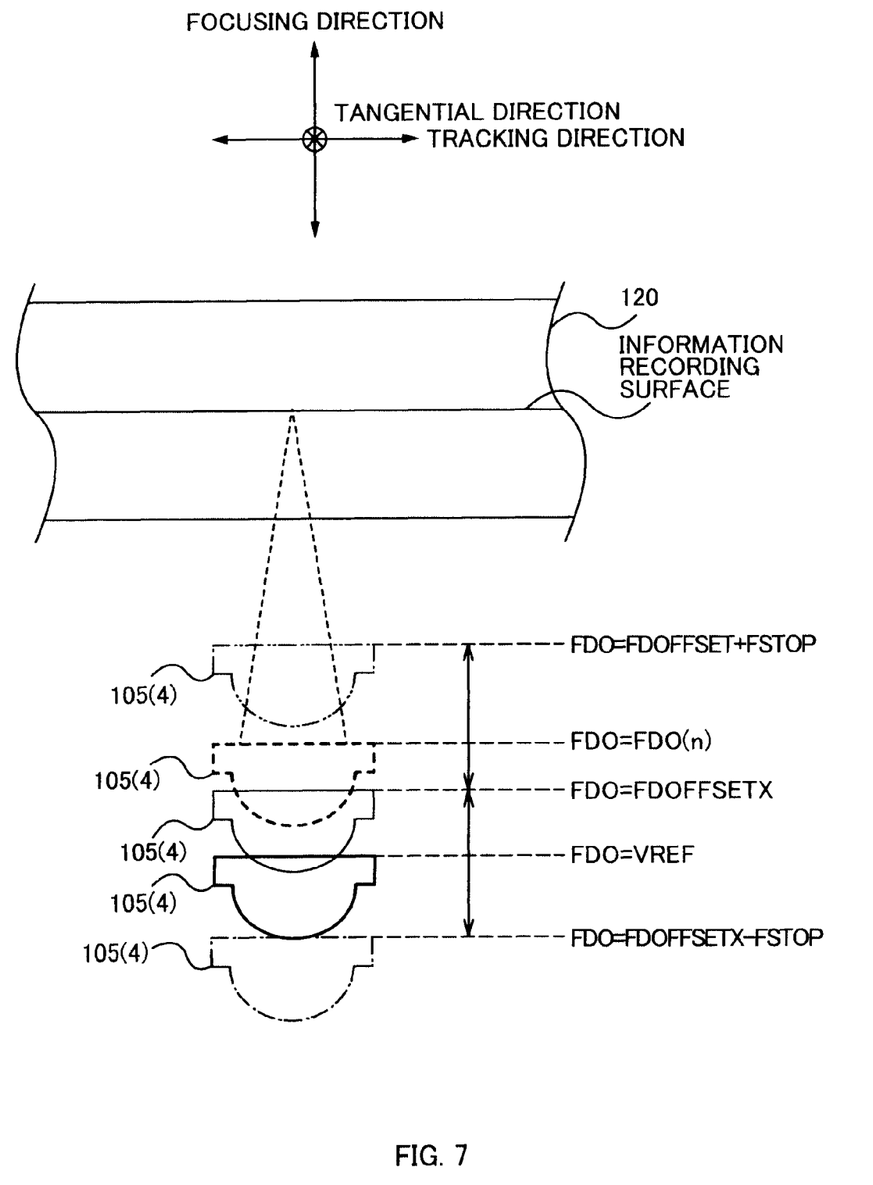
FIG. 7 is a diagram showing a movement of an objective lens in a focusing direction.

The focus search is described in detail hereinafter with reference to FIGS. 5 to 7. FIG. 5 is a block diagram briefly illustrating the configuration of an optical disc apparatus 100. FIG. 6 is a waveform diagram showing a focus error signal (hereinafter, referred to as FE signal) and an output signal of a focus servo apparatus 102 (FDO). FIG. 7 is a diagram showing the movement of an objective lens 105 included in an optical pickup 104 in the focusing direction according to the level of the output signal FDO. Description is made supposing that the position of the objective lens 105 before the start of focus search is a position drawn by a thick solid line in FIG. 7. The above position of the objective lens 105 before the start of focus search means: a position corresponding to the level of an output voltage FDO (VREF) when the power supply voltage is turned on for the optical disc apparatus 100, for example; or a position corresponding to the level of an output voltage FDO (VREF) at the end of the previous focus servo operation.

The optical disc apparatus 100 enters the focus search mode when the power supply is turned-on. A microcomputer 101 transmits to the focus servo apparatus 102 a start signal for executing a process (fruitless search) of detecting the top level (S_MAX) and the bottom level (S_MIN) of the FE signal in the focus search, in order to correspond to different reflectance for each type of an optical disc 120. First, the focus servo apparatus 102 outputs the output signal FDO at a level corresponding to a predetermined solid-line position (FDOFFSETX) in order to move the objective lens 105 in the focusing direction to the predetermined solid-line position (t10). The predetermined solid-line position is generally determined to be set in the middle of the movable range (between a dot-dashed line position and a double-dot-dashed line position) of the objective lens 105 in the focusing direction, which is determined depending on the characteristics of a focus actuator 106 (magnetic action between a magnetic member and a focus servo coil, etc.) or the like. Because, in the conventional focus search, the fruitless search and the process (focus-on search) of detecting the level of an output signal FDO at which laser beam converged by the objective lens 105 is focused on (hereinafter, referred to as focus-on) the information recording surface of the optical disc 120, are performed, while the objective lens 105 moves from the dot-dashed line position to the double-dot-dashed line position (or from the double-dot-dashed line position to the dot-dashed line position), according to a mode instructed by the microcomputer 101. Therefore, in order to correspond promptly to any mode, the focus servo apparatus 102 performs the fruitless search and the focus-on search from the predetermined solid-line position as an initial position for the start of the focus search. The objective lens 105 is moved to the predetermined solid-line position by the focus actuator 106 that is applied with a control voltage corresponding to the output signal FDO at FDOFFSETX from a driver 103.

Subsequently, the focus servo apparatus 102 decreases the level of the output signal FDO to FDOFFSETX−FSTOP (t10 to t11) in order to increase the level of the output signal FDO from, e.g., FDOFFSETX−FSTOP to FDOFFSETX+FSTOP for the detection of the top and the bottom levels of an FE signal. Thereby, the objective lens 105 moves to the dot-dashed line position corresponding to the output signal FDO at FDOFFSETX−FSTOP. The focus servo apparatus 102 outputs an output signal FDO increasing in level from FDOFFSETX−FSTOP to FDOFFSETX+FSTOP (t11 to t12). Thereby, the objective lens 105 moves from the dot-dashed line position corresponding to the output signal FDO at FDOFFSETX−FSTOP to the double-dot-dashed line position corresponding to the output signal FDO at FDOFFSETX+FSTOP. During the focus search, the optical pickup 104 emits the laser beam with a wave length conformed to the standard of the optical disc 120 (CD: 780 nm to 790 nm, DVD: 650 nm to 660 nm, etc.). The laser beam is converged by the objective lens 105 to be emitted to the optical disc 120. The optical pickup 104 then generates a photoelectric conversion signal from the reflected light of the laser beam applied to the information recording surface of the optical disc 120, and outputs the photoelectric conversion signal to an RF (Radio Frequency) amplifier 107. The RF amplifier 107 generates an FE signal, an RF signal, etc. based on the photoelectric conversion signal, and outputs the FE signal to the focus servo apparatus 102. The focus servo apparatus 102 detects the top and the bottom levels of the FE signal, and detects: whether the top level of the FE signal does not reach +FS_TH (the top level thereof in absolute value is smaller than +FS_TH in absolute value); and whether the bottom level of the FE signal does not reach −FS_TH (the bottom level thereof in absolute value is smaller than −FS_TH in absolute value). The focus servo apparatus 102 so adjusts the gain of a variable gain amplifier circuit (not shown) included in the focus servo apparatus 102 for amplifying the FE signal, as to increase the top level up to greater than or equal to +FS_TH, if the focus servo apparatus 102 detects that, for example, the top level of the FE signal does not reach +FS_TH. The focus servo apparatus 102 then decreases the level of the output signal FDO to FDOFFSETX in order to end the fruitless search (t12 to t13). Thus the objective lens 105 moves to the solid-line position that is predetermined based on the output signal FDO at FDOFFSETX (end of fruitless search).

Subsequently, the microcomputer 101 transmits a signal for performing focus-on search to the focus servo apparatus 102. The focus servo apparatus 102 first decreases the level of the output signal FDO to FDOFFSETX−FSTOP (t14 to t15) in order to increase the level of the output signal FDO, e.g., from FDOFFSETX−FSTOP to FDOFFSETX+FSTOP for the detection of the level of the output signal FDO at focus-on. Thus the objective lens 105 moves to the dot-dashed line position corresponding to the output signal FDO at FDOFF-SETX−FSTOP. The focus servo apparatus 102 outputs an output signal FDO which increases in level from FDOFF-SETX−FSTOP to FDOFFSETX+FSTOP (t15 to t17). The focus servo apparatus 102 then detects whether the FE signal has reached +FS_TH in the process of increasing the level of the output signal FDO from FDOFFSETX−FSTOP. If the focus servo apparatus 102 detects that the FE signal has reached +FS_TH (t16), the level of the output signal FDO when the FE signal returns to "0" is detected. If the focus servo apparatus 102 detects that the FE signal has returned to "0" (t17), it is then detected that the level of the output signal FDO (FDO(n)) is an level at which the focus-on can be performed(end of focus-on search and focus search).

The focus servo apparatus 102 sets the level of the output signal FDO at the start of the focus servo at the FDO(n). Consequently, the focus servo is started in order to reproduce or record information from or into the optical disc 120, while the objective lens 105 being maintained at the state of being positioned at a broken-line position based on the output signal FDO at the level of FDO(n) (t17 or later). During a period when information is reproduced or recorded from or into the optical disc 120, laser beam is focused on the information recording surface of the optical disc 120 as a result of performing focus servo based on the output signal FDO at a level obtained by adding or subtracting a level according to the FE signal to or from the FDO(n). It is thereby achieved that information is reproduced or recorded in satisfactory condition (see Japanese Utility Model Laid-Open Publication No. 5-55310, and Japanese Patent No. 3476112).

However, in a conventional focus servo apparatus, there has been a possibility of an abrupt change in the level of an output signal FDO since the level of the output signal FDO (VREF) before the start of focus search is set at FDOFFSETX in order to move the objective lens 105 to the predetermined solid-line position. In this case, control voltage applied to the focus actuator 106 changes abruptly, and thus there has been a possibility that the objective lens 105 vibrates. If the objective lens 105 vibrates, there has been a possibility that the focus actuator 106 cannot respond to a control voltage subsequently applied thereto, which results in a risk that focus search cannot be performed in a satisfactory condition. Or there has been a risk that focus search needs a longer time.

SUMMARY OF THE INVENTION

A focus servo apparatus for an optical disc apparatus according to an aspect of the present invention, the optical disc apparatus including an objective lens to converge laser beam on an information recording surface of an optical disc, and an actuator to move the objective lens in a focusing direction crossing the information recording surface, comprises: a retaining unit configured to retain control data for driving the actuator; and a setting unit configured to set the control data retained by the retaining unit as initial data for driving the actuator, in the case of driving the actuator, to detect a position of the objective lens where the laser beam is focused on the information recording surface, as a target position when performing focus servo.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

===Entire Configuration of Optical Disc Apparatus 1===

Figure 2:
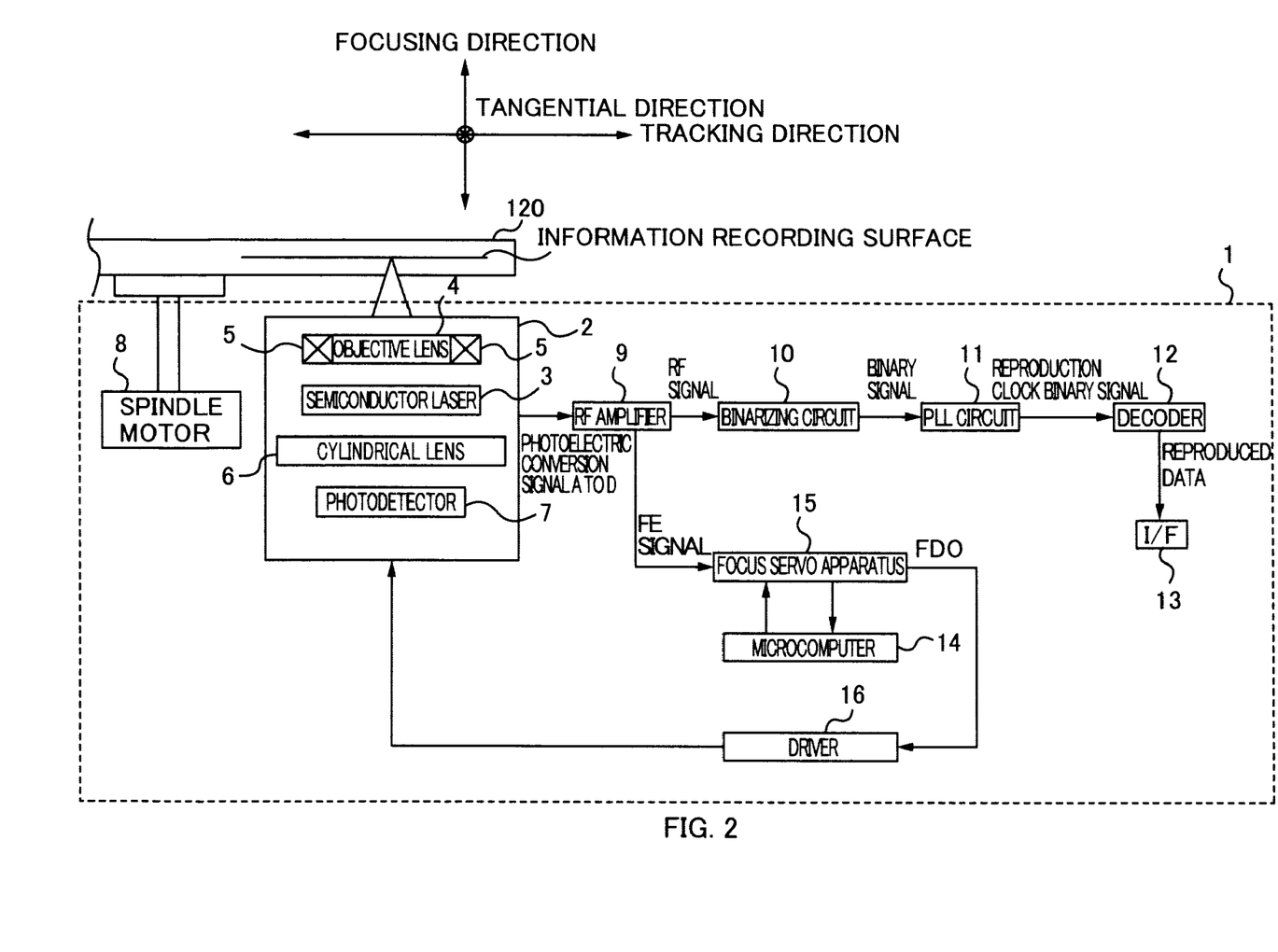
FIG. 2 is a block diagram illustrating an entire configuration of an optical disc apparatus equipped with a focus servo apparatus according to an embodiment of the present invention.

The entire configuration of an optical disc apparatus 1 equipped with a focus servo apparatus 15 according to an embodiment of the present invention is described hereinafter with reference to FIGS. 2 and 3. FIG. 2 is a block diagram illustrating an example of the entire configuration of the optical disc apparatus 1. FIG. 3 is a diagram showing the appearance of the reception of reflected laser light on the light reception surfaces A to D of a photodetector 7 shown in FIG. 2. The optical disc apparatus 1 is described supposing that focus servo is performed based on an astigmatic method, for example. In this embodiment, although an optical disc 120 is described as a CD standard optical disc, for example, the focus servo apparatus 15 according to an embodiment of the present invention can also be applied to the optical discs of other standards (DVD standard, Blue-ray Disc (registered trade mark) standard, etc.).

Figure 1:
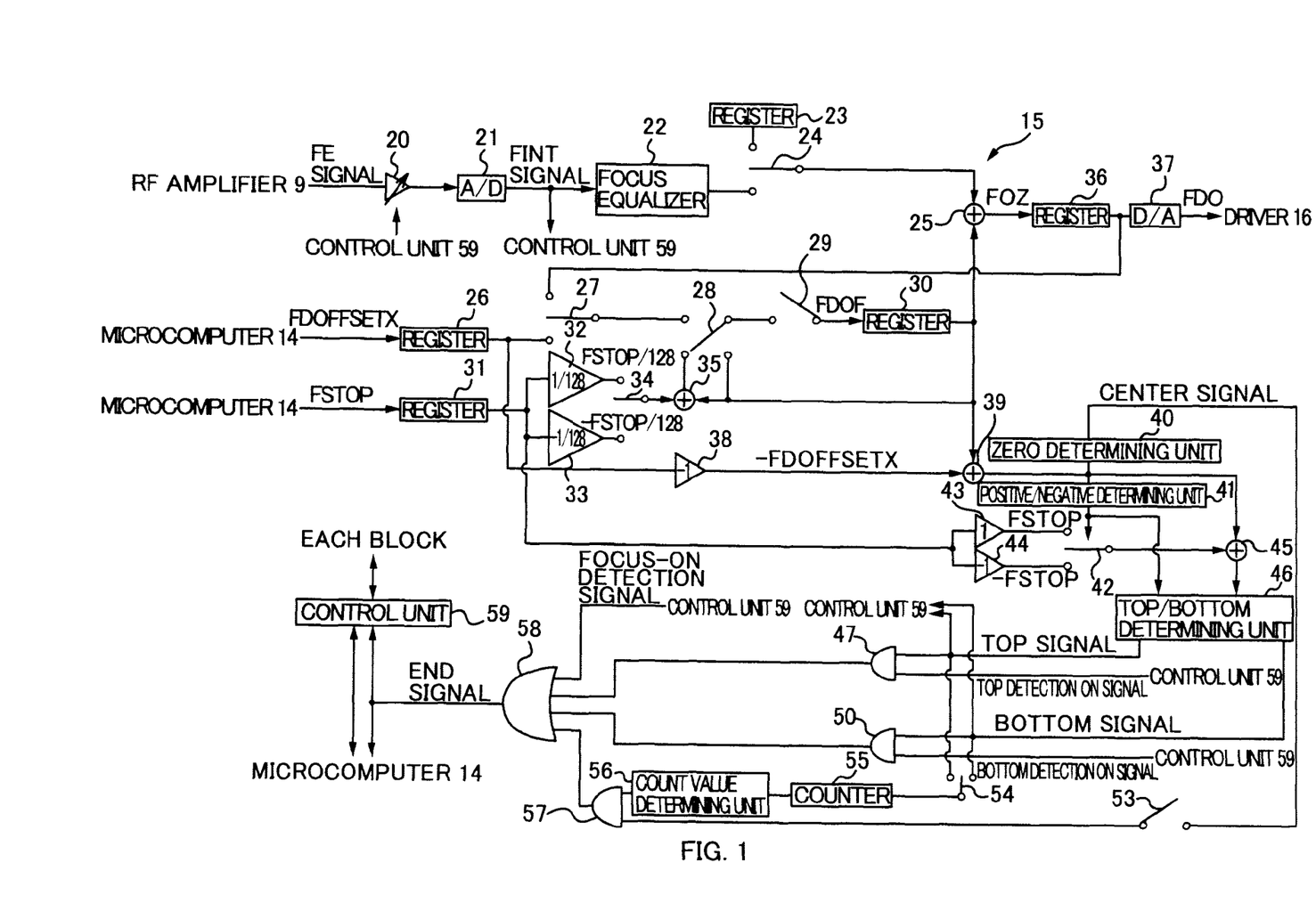
FIG. 1 is a circuit block diagram illustrating an entire configuration of a focus servo apparatus according to an embodiment of the present invention.

The optical disc apparatus 1 includes an optical pickup 2, an RF amplifier 9, a microcomputer 14, the focus servo apparatus 15, a driver 16, a binarizing circuit 10, a PLL (Phase Locked Loop) circuit 11, a decoder 12, an interface (I/F) 13, and a spindle motor 8. In this embodiment, the description of a configuration etc. for controlling a tracking servo, a tilting servo, a thread, etc., which are comprised in a general optical disc apparatus, is omitted, since they are not related to the present invention. However, it is also possible to add the configuration etc. for tracking servo or the like to the optical disc apparatus 1. Although the optical disc apparatus 1 illustrated in FIG. 1 shows a configuration for reproducing information from the information recording surface of the optical disc 120, it is also possible to add a configuration (an encoder, a laser pulse generating circuit, etc.) for recording information into the optical disc 120.

With the application of control voltage to a spindle motor coil (not shown) from the driver 16, for example, the spindle motor 8 rotates at a rotational speed corresponding to the level of the control voltage, and turns the optical disc 120 that is set by a chucking mechanism (not shown), for example, to a predetermined rotational direction.

The optical pickup 2 includes a semiconductor laser 3, an objective lens 4, a focus actuator 5, a cylindrical lens 6, and a photodetector 7. In this embodiment, descriptions on other various optical systems (a collimator lens, a polarizing beam splitter, etc.), a quarter-wave plate, etc. included in a general optical pickup are omitted as they are not related to the present invention.

The semiconductor laser 3 is configured with a pn-junction diode made of a p-type semiconductor and an n-type semiconductor, for example. With the application of control voltage from a laser driving circuit (not shown), the semiconductor laser 3 emits laser beam with a wave length (780 nm to 790 nm) conformed to the standard of the optical disc 120.

The objective lens 4 converges the laser beam that passes through or is reflected by various optical systems, on the information recording surface of the optical disc 120. The objective lens 4 converts the reflected light of the laser beam that is applied to the information recording surface of the optical disc 120, into substantially parallel beam to be emitted to the various optical systems or the like. The objective lens 4 is held by a holder (not shown) that includes a coil for focus servo, etc.

The focus actuator 5 includes magnetic members (a magnet, a yoke, etc.) for focus servo, a suspension wire that is fixed at its one end to the holder holding the objective lens 4, etc. By magnetic action of the magnetic members and the focus servo coil, which is generated with the application of control voltage from the driver 16, the focus actuator 5 moves the objective lens 4 in the focusing direction according to the level of control voltage.

The cylindrical lens 6 introduces astigmatism in the reflected laser light that passes through or is reflected by the optical systems, to be emitted to the photodetector 7.

Figure 3A:
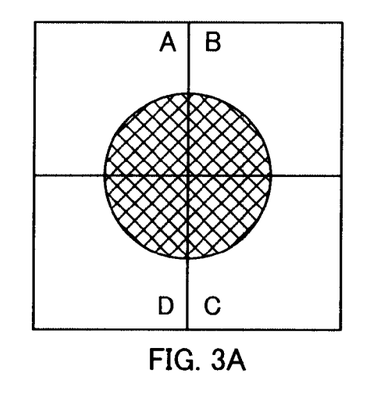
FIG. 3 is a diagram showing an appearance of reception of reflected laser light on light reception surfaces of a photodetector.
Figure 3B:
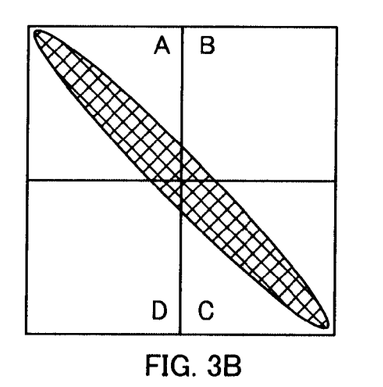
Figure 3C:
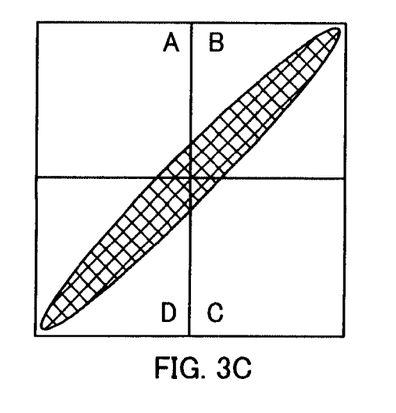

The photodetector 7 has, e.g., four light reception surfaces A to D shown in FIGS. 3A to 3C, to receive reflected laser light. The photodetector 7 generates photoelectric conversion signals a to d according to the quantities of the reflected laser lights received by the light reception surfaces A to D, to be output to the RF amplifier 9. In the case that the laser beam is focus-on, as shown in FIG. 3A, the reflected laser light to be received by the light reception surfaces A to D is applied substantially equally on each of light reception surfaces A to D. As a result, the photoelectric conversion signals a to d become signals with substantially equivalent values. In the case that the laser beam from the objective lens 4 is converged and then applied to the information recording surface of the optical disc 120, the reflected laser lights to be received by the light reception surfaces A to D are received as shown in FIG. 3B due to introduction of astigmatism. As a result, the values of photoelectric signals a and c are greater than those of photoelectric signals b and d. In the case that the application of the laser beam from the objective lens 4 to the information recording surface of the optical disc 120 is performed prior to the convergence of the laser beam, the reflected laser light to be received by the light reception surfaces A to D are received as shown in FIG. 3C due to introduction of astigmatism. As a result, the values of photoelectric signals b and d are greater than those of photoelectric signals a and c.

The RF amplifier 9 amplifies the photoelectric signals a to d by a predetermined gain, and outputs an RF signal obtained as a result of operation processing, that is, photoelectric signal a+photoelectric signal b+photoelectric signal c+photoelectric signal d, to the binarizing circuit 10. The RF amplifier 9 also outputs an FE signal obtained as a result of operation processing, that is, (photoelectric signal a+photoelectric signal c)−(photoelectric signal b+photoelectric signal d), to the focus servo apparatus 15.

The binarizing circuit 10 includes e.g., a comparator circuit and an integrator circuit (both are not shown), and includes such a configuration that a slice level is feedback-controlled by integrating an output from the comparator circuit in the integrator circuit and by inputting the integrated output to one of input terminals of the comparator circuit. The binarizing circuit 10 then binarizes at a slice level the RF signal that is input to the other of the input terminals of the comparator circuit, to be output to the PLL circuit 11.

The PLL circuit 11 includes e.g., a phase comparator circuit, a frequency divider, a charge pump circuit, a low-pass filter, and a VCO (Voltage Controlled Oscillator) circuit (all are not shown). The PLL circuit 11 compares the phase of a binary signal with the phase of a clock at a predetermined frequency, and generates a reproduction clock to be phase-locked to the binary signal, to be output to the decoder 12 with the binary signal.

The decoder 12 detects a signal recorded on the information recording surface of the optical disc 120 by detecting the level of the binary signal at, e.g., the fall of the reproduction clock. The decoder 12 applies such decoding processes to the above signal as a demodulation process (EFM (Eight Fourteen Modulation)) and an error correction process (CIRC (Cross Interleaved Reed-Solomon Code)), that is conformed to the standard of the optical disc 120. Consequently, the information (reproducing data) recorded on the information recording surface of the optical disc 120 is reproduced.

The interface 13 is provided for transmitting/receiving information between e.g. a host computer (not shown) that is connected through a connecting terminal (not shown), and the optical disc apparatus 1. For the interface 13, ATAPI (AT Attachment Packet Interface) standard, SCSI (Small Computer System Interface) standard, IEEE (Institute of Electrical and Electronic Engineers) 1394 standard, USB (Universal Serial Bus) standard, etc. are available.

The microcomputer 14 includes a CPU (Central Processing Unit), a ROM (Read Only Memory), and an interface, which are not shown. The microcomputer 14 sets the optical disc apparatus 1 in a focus search mode at the time when a power supply voltage for the optical disc apparatus 1 is turned on, for example. Specifically, at the start of the focus search, the microcomputer 14 transmits to the focus servo apparatus 15: a start signal for setting the level of the output signal FDO of the focus servo apparatus 15 at, e.g., FDOFFSETX−FSTOP; and data indicating FDOFFSETX and FSTOP (hereinafter, referred to as FDOFFSETX data and FSTOP data, respectively). The microcomputer 14 transmits to the focus servo apparatus 15 a start signal for performing the fruitless search in focus search, on receiving from the focus servo apparatus 15 a signal that indicates the level of the output signal FDO has reached FDOFFSETX−FSTOP. The microcomputer 14 transmits to the focus servo apparatus 15 a start signal for performing the focus-on search in focus search, on receiving from the focus servo apparatus 15 a signal that indicates the end of the fruitless search. The microcomputer 14 sets the optical disc apparatus 1 in an information reproducing mode on receiving from the focus servo apparatus 15 a signal that indicates the end of the level detection of the output signal FDO one the focus-on. Specifically, the microcomputer 14 transmits to the focus servo apparatus 15 a start signal to perform focus servo based on an FE signal.

The focus servo apparatus 15 sets the level of the output signal FDO at FDOFFSETX−FSTOP based on a start signal for setting the level of the output signal FDO at FDOFFSETX−FSTOP. The focus servo apparatus 15 then outputs to the microcomputer 14 a signal that indicates the level of the output signal FDO has reached FDOFFSETX−FSTOP. The focus servo apparatus 15 outputs the output signal FDO for detecting the top level (S_MAX) and the bottom level (S_MIN) of the FE signal based on the start signal for performing the fruitless search. The focus servo apparatus 15 detects the top and bottom levels of the FE signal, then performs the predetermined process, and outputs a signal that indicates the end of the fruitless search to the microcomputer 14. The focus servo apparatus 15 outputs an output signal FDO for detecting the level thereof on the focus-on based on a start signal for performing focus-on search. The focus servo apparatus 15 outputs to the microcomputer 14 a signal that indicates the detection of the level of an output signal FDO on the focus-on or that indicates that the level of the output signal FDO cannot be detected by the focus-on search. The focus servo apparatus 15 outputs an output signal FDO with a level obtained by adding or subtracting a level according to the FE signal to or from a level of the output signal FDO on the focus-on, based on the start signal for performing the focus servo. The specific configuration or the like of the focus servo apparatus 15 will be described later.

Based on the level of an output signal FDO from the focus servo apparatus 15, the driver 16 applies to the focus actuator 5 control voltage with a level corresponding to the level of the output signal FDO. Consequently, the objective lens 4 moves in the focusing direction according to the level of the control voltage. The driver 16 applies control voltage to the spindle motor coil of the spindle motor 8 based on an FG (Frequency Generator) signal generated by a spindle servo circuit (not shown), corresponding to the desired rotational speed of the spindle motor 8. Consequently, the spindle motor 8 rotates at a predetermined rotational speed.

The optical disc apparatus 1 is described supposing that focus servo is performed based on an astigmatic method, but it is not limited to this. For example, the optical pickup 2 is equipped with a diffraction grating (not shown) to generate zeroth-order light and ±first-order diffracted light from laser beam emitted by the semiconductor laser 3, and the photodetector 7 is equipped with light reception surfaces E to H (not shown) equivalent to the light reception surfaces A to D to receive +first-order diffraction reflected from the information recording surface of the optical disc 120, and with light reception surfaces I to L (not shown) to receive the reflected light of −first-order diffraction. Thereby, focus servo may be performed based on a differential astigmatic method using an FE signal obtained by performing the operation which is {(photoelectric conversion signal a+photoelectric conversion signal c)−(photoelectric conversion signal b+photoelectric conversion signal d)}+k[{(photoelectric conversion signal e+photoelectric conversion signal g)}−{(photoelectric conversion signal f+photoelectric conversion signal h)}+{(photoelectric conversion signal i+photoelectric conversion signal k)−(photoelectric conversion signal j+photoelectric conversion signal l)}].

The microcomputer 14 and the focus servo apparatus 15 are provided separately, but it is not limited to this. For example, the focus servo apparatus 15 and the microcomputer 14 may be integrated.

===Configuration of Focus Servo Apparatus 15 Etc.===

A configuration of a focus servo apparatus 15 etc. according to an embodiment of the present invention will be described hereinafter using FIG. 1 and referring appropriately to FIGS. 2 and 7. FIG. 1 is a circuit block diagram illustrating an example of an entire configuration of the focus servo apparatus 15 according to an embodiment of the present invention.

A variable gain amplifier circuit 20, the gain thereof being controlled by a control unit 59, amplifies with the controlled gain an FE signal from an RF amplifier 9, to be output.

An AD converter 21 analogue/digital-converts the FE signal, and outputs an FINT signal obtained by the above conversion to a focus equalizer 22 and the control unit 59.

During a period when focus servo is performed, the focus equalizer 22 outputs a signal for focusing laser beam on the information recording surface of an optical disc 120, based on the FINT signal.

A register 23 retains data for the addition of "0" at an adding circuit 25.

During a period when focus search is performed, a switching circuit 24 switches to the side of the register 23 according to a control signal from the control unit 59. During a period when focus servo is performed, the switching circuit 24 switches to the side of the focus equalizer 22 according to a control signal from the control unit 59.

A register 26 retains FDOFFSETX data from a microcomputer 14. The FDOFFSETX data is a data for setting a level of an output signal FDO at FDOFFSETX when a register 36 retains FDOFFSETX data. That is, the FDOFFSETX data is a data for moving an objective lens 4 in the focusing direction to a solid-line position shown in FIG. 7.

The register 31 retains FSTOP data from the microcomputer 14. The FSTOP data is a data for setting a level of an output signal FDO at FDOFFSETX+FSTOP when the register 36 retains a data obtained by adding FSTOP data to FDOFFSETX data. The FSTOP data is also a data for setting a level of an output signal FDO at FDOFFSETX−FSTOP when the register 36 retains a data obtained by adding −FSTOP data to FDOFFSETX data. That is, the FSTOP data is a data: for moving the objective lens 4 in the focusing direction to a double-dot-dashed line position (first predetermined position) shown in FIG. 7, by being added to the FDOFFSETX data; or for moving the objective lens 4 in the focusing direction to a dot-dashed line position (second predetermined position) shown in FIG. 7, by being subtracted from the FDOFFSETX data. In this embodiment, the double-dot-dashed line position shown in FIG. 7 is regarded as a position at which the objective lens 4 is positioned the closest to the optical disc 120, where the objective lens is moved by magnetic action between a magnetic member of a focus actuator 5 and a focus servo coil. The dot-dashed line position shown in FIG. 7 is regarded as a position at which the objective lens 4 is positioned the farthest from the optical disc 120, where the objective lens 4 is moved by magnetic action between a magnetic member of the focus actuator 5 and the focus servo coil.

A switching circuit 27 switches to the side of the register 36 according to a control signal from the control unit 59 on the start of focus search. The switching circuit 27 switches to the side of the register 26 according to a control signal from the control unit 59 on the start of conventional focus search. The switching circuit 27 stays at a floating position when no control signal is input from the control unit 59.

A switching circuit 28 switches to the side of the switching circuit 27 according to a control signal from the control unit 59 on the start of focus search. The switching circuit 28 then switches, e.g., to the side of an adding circuit 35, according to a control signal from the control unit 59 after the switching to the side of the switching circuit 27.

A switch circuit 29 is closed according to a control signal from the control unit 59 on the start of focus search. By the operations of the switching circuits 27, 28, and the switch circuit 29 on the start of focus search, FOZ data (control data) retained at the time by the register 36 is retained by a register 30, and consequently, the FOZ data will be retained again by the register 36 as an initial data for driving the focus actuator 5. The switch circuit 29 is opened according to a control signal from the control unit 59. As a result, FDOF data retained by the register 30 and FOZ data retained by the register 36 are not varied. The switch circuit 29 is opened according to a control signal from the control unit 59 during a period when a focus servo is performed. In the case that conventional focus search is performed, the switching circuit 27 is made to switch to the side of the register 26, and FOZ data retained by the register 30 is set as FDOFFSETX data, thereby FDOF data retained by the register 36 is set as FDOFFSETX data.

A multiplication circuit 32 converts FSTOP data retained by the register 31 into data indicating an FSTOP/128 level (hereinafter, referred to as FSTOP/128 data) obtained by multiplying an output signal FDO with an FSTOP level by 1/128, to be output.

A multiplication circuit 33 converts FSTOP data retained by the register 31 into data indicating a −FSTOP/128 level (hereinafter, referred to as −FSTOP/128 data) obtained by multiplying an output signal FDO with an FSTOP level by −1/128, to be output. In this embodiment, although the multiplication circuits 32 and 33 output data that are obtained by multiplying the output signal FDO with an FSTOP level by 1/128 or −1/128, it is not limited to this. An arbitrary multiplying factor may be employed.

A switching circuit 34 switches to the side of the multiplication circuit 32 according to a control signal from the control unit 59 for increasing the level of an output signal FDO. The switching circuit 34 switches to the side of the multiplication circuit 33 according to a control signal from the control unit 59 for decreasing the level of an output signal FDO.

In the case that the switching circuit 34 switches to the side of the multiplication circuit 32, an adding circuit 35 outputs FDOF+FSTOP/128 data obtained by adding FSTOP/128 data output from the multiplication circuit 32 to FDOF data retained by the register 30. Subsequently, the switching circuit 28 switches to the side of the adding circuit 35, and thereby, FDOF data retained by the register 30 becomes FDOF+FSTOP/128 data. By repeating the above process until a top-bottom determining unit 46, which will be described later, outputs a top-signal, the FDOF data retained by the register 30 becomes FDOFFSETX+FSTOP data (first control data). The increase of FDOF data retained by the register 30 up to FDOFFSETX+FSTOP data becomes slower, as the number of times the switching circuit 28 switches to the input side of the FDOF data of the adding circuit 35 increases. In the case that the switching circuit 34 switches to the side of the multiplication circuit 33, an adding circuit 35 outputs FDOF−FSTOP/128 data obtained by adding −FSTOP/128 data output from the multiplication circuit 33 to FDOF data retained by the register 30. Subsequently, the switching circuit 28 switches to the side of the adding circuit 35, and thereby, FDOF data retained by the register 30 becomes FDOF−FSTOP/128 data. By repeating the above process until the top-bottom determining unit 46, which will be described later, outputs a bottom-signal, the FDOF data retained by the register 30 becomes FDOFFSETX−FSTOP data (second control data). The decrease of FDOF data retained by the register 30 down to FDOFFSETX−FSTOP data becomes slower, as the number of times the switching circuit 28 switches to the input side of FDOF data of the adding circuit 35 increases.

In the case that the switching circuit 24 switches to the side of the register 23, the adding circuit 25 adds data indicating "0", which is retained by the register 23, to FDOF data retained by the register 30, and outputs FOZ data obtained by the above addition. In the case that the switching circuit 24 switches to the side of the focus equalizer 22, the adding circuit 25 adds data from the focus equalizer 22 for focus servo, to FDOF data retained by the register 30, and outputs FOZ data obtained by the above addition.

The register 36 retains FOZ data. The FOZ data retained by the register 36 becomes the same data as FDOF data retained by the register 30 during a period when focus search is performed. The FOZ data retained by the register 36 becomes the data obtained by adding a signal from the focus equalizer 22 for focus servo to FDOF data retained by the register 30 during a period when focus servo is performed.

A DA converter 37 digital/analogue-converts FOZ data retained by the register 36 into the output signal FDO, to be output to the driver 16.

A multiplication circuit 38 converts FDOFFSETX data retained by the register 26 into data indicating a −FDOFFSETX level (hereinafter, referred to as −FDOFFSETX data) obtained by multiplying an output signal FDO with a FDOFFSETX level by −1, to be output.

An adding circuit 39 outputs FDOF−FDOFFSETX data obtained by adding −FDOFFSETX data output from the multiplication circuit 38, to FDOF data retained by the register 30. In the case that FDOF data retained by the register 30 is equivalent to FDOFFSETX data, FDOF−FDOFFSETX becomes data indicating "0". In the case that FDOF data retained by the register 30 is equivalent to FDOFFSETX +α data, FDOF−FDOFFSETX becomes data indicating "+α" (positive). In the case that FDOF data retained by the register 30 is equivalent to FDOFFSETX −α data, FDOF−FDOFFSETX becomes data indicating "−α" (negative)

A zero determining unit 40 determines whether or not FDOF−FDOFFSETX data is "0". When it is determined that the FDOF−FDOFFSETX data is "0", the zero determining unit 40 outputs a center signal with a high level. When it is determined that the FDOF−FDOFFSETX data is not "0", the zero determining unit 40 outputs a center signal with a low level.

A positive/negative determining unit 41 determines whether FDOF−FDOFFSETX data is "positive" or "negative". When FDOF−FDOFFSETX data is determined to be "positive", the positive/negative determining unit 41 outputs a signal (hereinafter, referred to as a positive signal) for a switching circuit 42 to switch to the side of a multiplication circuit 44, to the switching circuit 42 and the top-bottom determining unit 46. When FDOF−FDOFFSETX data is determined to be "negative", the positive/negative determining unit 41 outputs a signal (hereinafter, referred to as a negative signal) for a switching circuit 42 to switch to the side of a multiplication circuit 43, to the witching circuit 42 and the top/bottom determining unit 46.

The multiplication circuit 43 converts FSTOP data retained by the register 31 into FSTOP data indicating an FSTOP level obtained by multiplying an output signal FDO with FSTOP level by 1, to be output. Since the input signal (FSTOP data) and the output signal (FSTOP data) of the multiplication circuit 43 are identical with each other, the multiplication circuit 43 may be excluded from a configuration of the focus servo apparatus 15.

The multiplication circuit 44 converts FSTOP data retained by the register 31 into data indicating a −FSTOP level (hereinafter, referred to as −FSTOP data) obtained by multiplying an output signal FDO with FSTOP level by −1, to be output.

The switching circuit 42 switches to the side of the multiplication circuit 43 according to a negative signal. The switching circuit 42 switches to the side of the multiplication circuit 44 according to a positive signal.

In the case that the switching circuit 42 switches to the side of the multiplication circuit 43, an adding circuit 45 outputs FDOF−FDOFFSETX+FSTOP data obtained by adding FSTOP data to FDOF−FDOFFSETX data. If FDOF−FDOFFSETX data is equivalent to −FSTOP data, FDOF−FDOFFSETX+FSTOP data indicates "0". In the case that the switching circuit 42 switches to the side of the multiplication circuit 44, the adding circuit 45 outputs FDOF−FDOFFSETX−FSTOP data obtained by adding −FSTOP data to FDOF−FDOFFSETX data. If FDOF−FDOFFSETX data is equivalent to FSTOP data, FDOF−FDOFFSETX−FSTOP data indicates "0".

The top/bottom determining unit 46 outputs a top signal with a high level according to a positive signal and FDOF−FDOFFSETX−FSTOP data indicating "0". The top/bottom determining unit 46 outputs a bottom signal with a high level according to a negative signal and FDOF−FDOFFSETX+FSTOP data indicating "0".

An AND circuit 47 outputs a high level according to a top signal with a high level and top-detection ON signal with a high level from the control unit 59. In the cases other than the above, the AND circuit 47 outputs a low level.

An AND circuit 50 outputs a high level according to a bottom signal with a high level and a bottom-detection ON signal with a high level from the control unit 59. In the cases other than the above, the AND circuit 50 outputs a low level.

A switch circuit 53 is closed, according to a control signal from the control unit 59 when a conventional focus search is performed.

In the case that conventional focus search is performed, a switching circuit 54 switches to the side of the AND circuit 47 or 50 according to a control signal from the control unit 59.

In the case that the switching circuit 54 switches to the side of the AND circuit 47, a counter 55 counts, e.g., the rising to a top signal with a high level. In the case that the switching circuit 54 switches to the side of the AND circuit 50, a counter 55 counts, e.g., the rising to a bottom signal with a high level.

A count value determining unit 56 determines whether or not the count value of the counter 55 reaches, e.g., "2". If the count value of the counter 55 is determined to reach "2", the count value determining unit 56 outputs a high level. The count value "2" indicates the number of times the level of an output signal FDO at focus-on is detected during focus-on search in focus search.

An AND circuit 57 outputs a high level according to a center signal with a high level when a switch circuit 53 is closed and to a high level from the count value determining unit 56. In the cases other than the above, the AND circuit 57 outputs a low level.

An OR circuit 58 outputs a end signal with a high level, if any of: a focus-on detection signal with a high level from the control unit 59, which indicates the detection of the level of an output signal FDO at focus-on; a high level from the AND circuit 47; a high level from the AND circuit 50; and a high level from the AND circuit 57, is input. If none of them is input, the OR circuit 58 outputs an end signal with a low level.

The control unit 59 is a block that exercises centralized control over the focus servo apparatus 15. An operation of the control unit 59 will be explained in detail in the description of an operation of the focus servo apparatus 15 hereinbelow.

===Operation of Focus Servo Apparatus 15===

Figure 4:
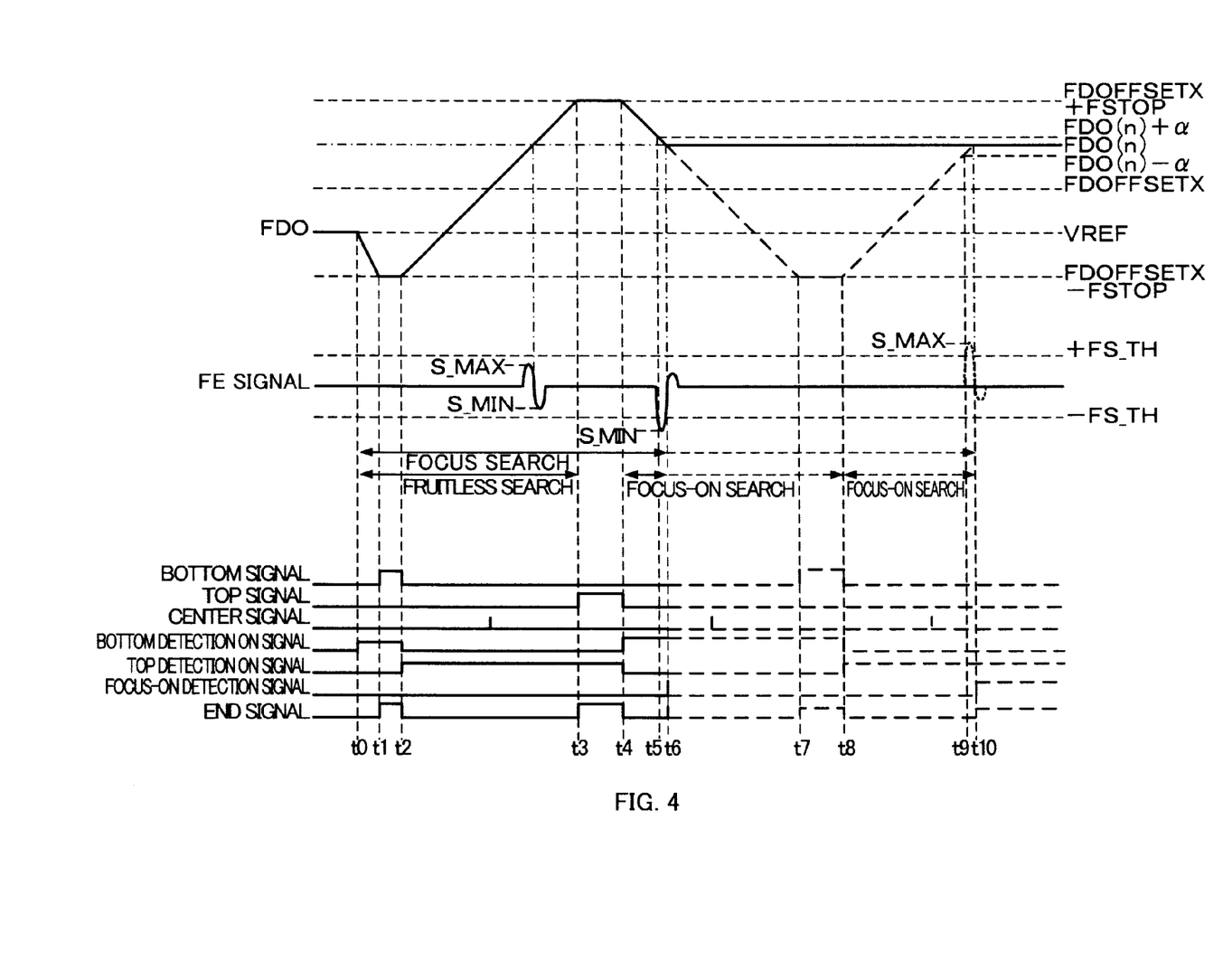
FIG. 4 is a waveform diagram showing output waveforms of an FE signal and of each block of focus servo apparatus according to an embodiment of the present invention.

An example of the operation of a focus servo apparatus 15 according to an embodiment of the present invention will be described hereinbelow using FIG. 4 and referring appropriately to FIGS. 1 to 3, and 7. FIG. 4 is a waveform diagram showing output waveforms of an FE signal and each block of focus servo apparatus 15. In this embodiment, description will be made supposing that FOZ data retained by a register 36 until the start of focus search is regarded as data for setting the level of an output signal FDO at VREF (hereinafter, referred to as VREF data), and therefore, an objective lens 4 is at a thick solid-line position shown in FIG. 7.

A microcomputer 14 set the optical disc apparatus 1 in a focus search mode when, e.g., power supply voltage for the optical disc apparatus 1 is turned on. The microcomputer 14 transmits to the focus servo apparatus 15 a start signal for setting the level of the output signal FDO of the focus servo apparatus 15 at FDOFFSETX−FSTOP, FDOFFSETX data, and FSTOP data.

With the application of control voltage to a spindle motor coil (not shown) from a driver 16, a spindle motor 8 rotates at a rotational speed corresponding to the level of the control voltage, and turns the optical disc 120 to a predetermined rotational direction. With the application of control voltage from a laser driving circuit (not shown), a semiconductor laser 3 emits laser beam with a wave length conformed to the standard of an optical disc 120. The laser beam passes through or is reflected by the various optical systems of an optical pickup 2, etc., and is converged by the objective lens 4. The reflected light of the laser beam applied to the information recording surface of the optical disc 120 is converted into substantially parallel light by the objective lens 4, and the parallel light passes through or is reflected by the various optical systems, to be input to a cylindrical lens 6. The reflected laser light, after undergoing the introduction of astigmatism thereto by the cylindrical lens 6, is received by the light reception surfaces A to D of a photodetector 7. The photodetector 7 generates photoelectric conversion signals a to d according to the quantities of reflected laser light received by the light reception surfaces A to D, to be output to an RF amplifier 9. The RF amplifier 9 generates an RF signal based on the photoelectric conversion signals a to d, to be output to a binarizing circuit 10, and also generates an FE signal, to be output to the focus servo apparatus 15.

The control unit 59 of the focus servo apparatus 15 outputs a bottom-detection ON signal with a high level to an AND circuit 50 according to a start signal for setting the level of an output signal FDO at FDOFFSETX−FSTOP (t0). The control unit 59 outputs: a control signal for a switching circuit 27 to switch to the side of a register 36; a control signal for a switching circuit 28 to switch to the side of the switching circuit 27; and a control signal for closing a switch circuit 29. Consequently, FOZ data (=VREF data) retained by the register 36 is retained by a register 30 as FDOF data. The control unit 59 outputs a control signal for a switching circuit 24 to the side of a register 23. An adding circuit 25 adds data indicating "0" that is retained by the register 23, to FDOF data (=VREF data) that is retained by the register 30, to be output as the FOZ data (=VREF data). The register 36 then retains the FOZ data (=VREF data). That is, when starting focus search, the register 36 retains the FOZ data (=VREF data) as an initial data for driving a focus actuator 5. The FOZ data retained by the register 36 is then digital/analogue converted by a DA converter 37 into an output signal FDO with a VREF level, to be output to a driver 16 (t0). The driver 16 applies to the focus actuator 5 control voltage with a level according to the output signal FDO with the VREF level, where the control voltage becomes equivalent to the level of a control voltage before focus search is performed. Consequently, the position of the objective lens 4 in the focusing direction does not change, but stays at a thick solid-line position shown in FIG. 7.

A register 26 retains FDOFFSETX data from the microcomputer 14. A register 31 retains FSTOP data from the microcomputer 14. In order to decrease the level of an output signal FDO down to FDOFFSETX−FSTOP (t0 to t1), the control unit 59 stops outputting a control signal to the switching circuit 27, and also outputs: a control signal for the switching circuit 28 to switch to the side of an adding circuit 35; and a control signal for the switching circuit 34 to switch to the side of an multiplication circuit 33. The adding circuit 35 outputs FDOF−FSTOP/128 (=VREF−FSTOP/128 data) obtained by adding −FSTOP/128 data output from the multiplication circuit 33 to FDOF data (=VREF data) retained by the register 30. Thus FDOF data retained by the register 30 and FOZ data retained by the register 36 become FDOF−FSTOP/128 data. The level of an output signal FDO of the DA converter 37 becomes VREF−FSTOP/128. Consequently, the position of the objective lens 4 in the focusing direction moves downward in FIG. 7. By repeating the above process, the FDOF data retained by the register 30 and FOZ data retained by the register 36 become FDOFFSETX−FSTOP data. Thus the level of an output signal FDO of the DA converter 37 becomes FDOFFSETX−FSTOP (t1). Consequently, the position of the objective lens 4 in the focusing direction moves to a dot-dashed line position shown in FIG. 7.

In response to the state that FDOF data retained by the register 30 becomes FDOFFSETX−FSTOP data, an adding circuit 39 outputs −FSTOP data obtained by adding −FDOFFSETX data from an adding circuit 39 to FDOFFSETX−FSTOP data. A positive/negative determining unit 41 outputs a negative signal to a switching circuit 42 and to a top/bottom determining unit 46 when −FSTOP data is determined to be "negative". An adding circuit 45 then outputs data indicating "0" obtained by adding FSTOP data from a multiplication circuit 43 to −FSTOP data from an adding circuit 39. The top/bottom determining unit 46 outputs a bottom signal with a high level according to the negative signal and to the data indicating "0" (t1 to t2). The AND circuit 50 outputs a high level according to a bottom signal with a high level and to a bottom detection ON signal with a high level. Consequently, an OR circuit 58 outputs an end signal with a high level to the control unit 59 and the microcomputer 14 (t1 to t2). According to the end signal with a high level, the control unit 59 outputs: a control signal for the switching circuit 28 to switch to the side of the switching circuit 27; and a control signal for opening the switch circuit 29. Consequently, the FDOF data retained by the register 30 and the FOZ data retained by the register 36 are retained invariantly as FDOFFSETX−FSTOP data, and the level of an output signal FDO of the DA converter 37 stays at FDOFFSETX−FSTOP level (t1 to t2). Thus the position of the objective lens 4 in the focusing direction is held at the dot-dashed line position shown in FIG. 7.

When the microcomputer 14 receives an end signal with a high level, a start signal for performing fruitless search is transmitted to the focus servo apparatus 15.

According to a start signal for performing fruitless search, the control unit 59 outputs a top detection ON signal with a high level to an AND circuit 47 (t2). The control unit 59 outputs: a control signal for the switching circuit 27 to switch to the side of the register 36; and a control signal for closing the switch circuit 29. Therefore FOZ data (=FDOFFSETX−FSTOP data) retained by the register 36 is retained by the register 30 as FDOF data. Consequently, the register 36 retains again the FDOF data (=FDOFFSETX−FSTOP data) retained by the register 30 as FOZ data. That is, when performing fruitless search, the register 36 retains FOZ data (=FDOFFSETX−FSTOP data) as data (=FDOFFSETX−FSTOP data) for driving the focus actuator 5. The control unit 59 then stops outputting a control signal to the switching circuit 27 in order to increase the level of an output signal FDO from FDOFFSETX−FSTOP to FDOFFSETX+FSTOP (t2 to t3) for the detection of the top and bottom levels of an FE signal, and also outputs: a control signal for the switching circuit 28 to switch to the side of the adding circuit 35; and a control signal for the switching circuit 34 to switch to the side of a multiplication circuit 32. The adding circuit 35 outputs FDOF+FSTOP/128 data (=FDOFFSETX−FSTOP×127/128 data) obtained by adding FSTOP/128 data output from the multiplication circuit 32 to FDOF data (=FDOFFSETX−FSTOP data) retained by the register 30. Thus the FDOF data retained by the register 30 and the FOZ data retained by the register 36 become FDOF+FSTOP/128 data. The level of an output signal FDO of the DA converter 37 becomes FDOFFSETX−FSTOP×127/128. Consequently, the position of the objective lens 4 moves upward in FIG. 7.

By repeating the above process, FDOF data retained by the register 30 and FOZ data retained by the register 36 become data (hereinafter, referred to as FDO(n)) for setting a level of an output signal FDO at FDO(n). An FE signal with an S-shape waveform, shown between t2 and t3 in FIG. 4, appears in the proximity of the FDO(n) level of an output signal FDO. An AD converter 21 analogue-digital converts the FE signal with an S-shape waveform into FINT signal, to be output to the control unit 59 and a focus equalizer 22. The control unit 59 detects the top level (S_MAX) and the bottom level (S_MIN) of an FE signal on the basis of the FINT signal, and detects whether the top level of the FE signal does not reach +FS_TH (the top level thereof in absolute value is smaller than +FS_TH in absolute value); and whether the bottom level of the FE signal does not reach −FS_TH (the bottom level thereof in absolute value is smaller than −FS_TH in absolute value). As shown between t2 and t3 in FIG. 4, when it is detected that the top level of the FE signal does not reach +FS_TH and that the bottom level of the FE signal does not reach −FS_TH, the control unit 59 outputs a control signal for controlling the gain of a variable gain amplifier circuit 20 to adjust: the top level of the FE signal in absolute value to be greater than or equal to +FS_TH in absolute value; and the bottom level of the FE signal in absolute value to be greater than or equal to −FS_TH in absolute value. By repeating the above process of adding FSTOP/128 data to FDOF data retained by the register 30, FDOF data retained by the register 30 and FOZ data retained by the register 36 become FDOFFSETX+FSTOP data. Therefore, the level of an output signal FDO of the DA converter 37 becomes FDOFFSETX+FSTOP (t3). Consequently, the position of the objective lens 4 in the focusing direction moves to a double-dot-dashed line position shown in FIG. 7. In this embodiment, the control unit 59 controls the gain of the variable gain amplifier circuit 20 to adjust: the top level of the FE signal in absolute value to be greater than or equal to +FS_TH in absolute value; and the bottom level of the FE signal in absolute value to be greater than or equal to −FS_TH in absolute value, but it is not limited to this way. For example, by directly controlling +FS_TH and −FS_TH, the control unit 59 may adjust the top level of the FE signal in absolute value to be greater than or equal to +FS_TH in absolute value; and the bottom level of the FE signal in absolute value to be greater than or equal to −FS_TH in absolute value.

In response to the state that FDOF data retained by the register 30 becomes FDOFFSETX+FSTOP data, an adding circuit 39 outputs FSTOP data obtained by adding −FDOFF-SETX data from the multiplication circuit 38 to the FDOFF-SETX+FSTOP data. The positive/negative determining unit 41 outputs a positive signal to the switching circuit 42 and the top/bottom determining unit 46 when FSTOP signal is determined to be "positive". The adding circuit 45 then outputs data indicating "0" obtained by adding −FSTOP data from a multiplication circuit 44 to FSTOP data from the adding circuit 39. The top/bottom determining unit 46 outputs a top signal with a high level according to the positive signal and the data indicating "0" (t3 to t4). The AND circuit 47 outputs a high level according to the top signal with a high level and a top detection ON signal with a high level. Consequently, the OR circuit 58 outputs an end signal with a high level to the control unit 59 and the microcomputer 14 (t3 to t4). According to the end signal with a high level, the control unit 59 outputs: a control signal for the switching circuit 28 to switch to the side of the switching circuit 27; and a control signal for opening the switch circuit 29. Consequently, the FDOF data retained by the register 30 and the FOZ data retained by the register 36 are retained invariantly as FDOFFSETX+FSTOP, and the level of an output signal FDO of the DA converter 37 stays at FDOFFSETX+FSTOP level (t3 to t4). Thus the position of the objective lens 4 in the focusing direction is held at the double-dot-dashed line position shown in FIG. 7. With the above detection of the top and bottom levels of the FE signal, the fruitless search in focus search is ended.

When the microcomputer 14 receives an end signal with a high level, a start signal for performing the focus-on search in focus search is transmitted to the focus servo apparatus 15.

According to a start signal for performing focus-on search, the control unit 59 outputs to the AND circuit 50 a bottom detection ON signal with a high level (t4). The control unit 59 outputs: a control signal for the switching circuit 27 to switch to the side of the register 36; and a control signal for closing the switch circuit 29. Therefore FOZ data (=FDOFFSETX+FSTOP data) retained by the register 36 is retained by the register 30 as FDOF data. Consequently, the register 36 retains again the FDOF data (=FDOFFSETX+FSTOP data) retained by the register 30 as FOZ data. That is, when performing focus-on search, the register 36 retains FOZ data (=FDOFFSETX+FSTOP data) retained by the register 36 as data (=FDOFFSETX+FSTOP data) for driving the focus actuator 5. The control unit 59 then stops outputting a control signal to the switching circuit 27 in order to decrease the level of an output signal FDO from FDOFFSETX+FSTOP to FDOFFSETX−FSTOP (t4 to t7) for the detection of a level of an output signal FDO at focus-on, and also outputs: a control signal for the switching circuit 28 to switch to the side of the adding circuit 35; and a control signal for the switching circuit 34 to switch to the side of the multiplication circuit 33. The adding circuit 35 outputs FDOF−FSTOP/128 data (=FDOFF-SETX+FSTOP×127/128 data) obtained by adding −FSTOP/128 data output from the multiplication circuit 33 to FDOF data (=FDOFFSETX+FSTOP data) retained by the register 30. Thus the FDOF data retained by the register 30 and the FOZ data retained by the register 36 become FDOF−FSTOP/128 data. The level of an output signal FDO of the DA converter 37 becomes FDOFFSETX+FSTOP×127/128. Consequently, the position of the objective lens 4 in the focusing direction moves downward in FIG. 7.

By repeating the above process, the level of an output signal FDO reaches FDO(n) +α, a level at which an FE signal with an S-shape waveform reaches −FS_TH (t5). When detecting that an FE signal reaches −FS_TH based on a FINT signal from an AD converter 21 at that time, the control unit 59 detects whether or not the FINT signal (FE signal) becomes "0" again. In other words, the control unit 59 detects the level of an output signal FDO at focus-on based on the state that an FE signal with an S-shape wave form reaches −FS_TH. When the level of an output signal FDO reaches FDO(n) by further repeating the above process (t6), an FINT signal (FE signal) becomes "0" again. When detecting that an FINT signal (FE signal) becomes "0" again, the control unit 59 outputs a focus-on detection signal with a high level to the OR circuit 58 and the microcomputer 14 (t6). Consequently, the OR circuit 58 outputs an end signal with a high level to the control unit 59 and the microcomputer 14 (t6). The control unit 59 outputs a control signal for opening the switch circuit 29 according to the end signal with a high level. Consequently, the FDOF data retained by the register 30 and the FOZ data retained by the register 36 are retained as FDO(n) invariantly, and the level of an output signal FDO of the DA converter 37 stays at an FDO(n) level (t6 or later). Thus the position of the objective lens 4 in the focusing direction is held at the broken line position shown in FIG. 7, which is a focus-on position. As a result, focus-on search and focus search are ended.

According to a focus-on detection signal with a high level and to an end signal with a high level, the switching circuit 24 switches to the side of the a focus equalizer 22. The adding circuit 25 adds a signal for focus servo, which is based on an FE signal from the focus equalizer 22, to FDOF data (=FDO(n) data) retained by the register 30, to be output as a FOZ data to the register 36. As a result, focus servo is performed based on an FE signal with a target position set at a broken line position of the objective lens 4 shown in FIG. 7, and thereby information is reproduced from the information recording surface of an optical disc 120 in satisfactory condition.

In the above embodiment, although focus search is ended in satisfactory condition based on the state that an FE signal with an S-shape waveform reaches −FS_TH at t5, there is a possibility that the FE signal with an S-shape waveform does not reach −FS_TH due to the generation of noise component etc. in the FE signal or the like. In this case, each block of the focus servo apparatus 15 performs each of processes indicated by broken wave lines in FIG. 4.

In detailed description, by repeating a process of adding −FSTOP/128 data to FDOF data retained by the register 30, the FDOF data retained by the register 30 and FOZ data retained by the register 36 become FDOFFSETX−FSTOP data. Thus the level of an output signal FDO of the DA converter 37 becomes FDOFFSETX−FSTOP (t7). Consequently, the position of the objective lens 4 in the focusing direction moves to a dot-dashed line position shown in FIG. 7.

In response to the state that FDOF data retained by the register 30 becomes FDOFFSETX−FSTOP data, an adding circuit 39 outputs −FSTOP data obtained by adding −FD-OFFSETX data from the multiplication circuit 38 to the FDOFFSETX−FSTOP data. The positive/negative determining unit 41 outputs a negative signal to the switching circuit 42 and the top/bottom determining unit 46 when determining that −FSTOP signal is "negative". The adding circuit 45 then outputs data indicating "0" obtained by adding FSTOP data from a multiplication circuit 43 to −FSTOP data from the adding circuit 39. The top/bottom determining unit 46 outputs a bottom signal with a high level according to the negative signal and the data indicating "0" (t7 to t8). The AND circuit 50 outputs a high level according to the bottom signal with a high level and a bottom detection ON signal with a high level. Consequently, the OR circuit 58 outputs an end signal with a high level to the control unit 59 and the microcomputer 14 (t7 to t8). According to the end signal with a high level, the control unit 59 outputs: a control signal for the switching circuit 28 to switch to the side of the switching circuit 27; and a control signal for opening the switch circuit 29. Consequently, the FDOF data retained by the register 30 and the FOZ data retained by the register 36 are retained as FDOFF−SETX−FSTOP data invariantly, and the level of an output signal FDO of the DA converter 37 stays at FDOFFSETX−FSTOP level (t7 to t8). Thus the position of the objective lens 4 in the focusing direction is held at the dot-dashed line position shown in FIG. 7.

When receiving an end signal with a high level in a state of not receiving focus-on signal with a high level, the microcomputer 14 transmits to the focus servo apparatus 15 a start signal for performing the focus-on search again.

According to a start signal for performing focus-on search, the control unit 59 outputs a top detection ON signal with a high level to the AND circuit 47 (t8). The control unit 59 outputs: a control signal for the switching circuit 27 to switch to the side of the register 36; and a control signal for closing the switch circuit 29. Therefore FOZ data (=FDOFFSETX−FSTOP data) retained by the register 36 is retained by the register 30 as FDOF data. Consequently, the register 36 retains the FDOF data (=FDOFFSETX−FSTOP data) retained by the register 30 as data (=FDOFFSETX−FSTOP data) for driving the focus actuator 5. The control unit 59 then stops outputting a control signal to the switching circuit 27 in order to increase the level of an output signal FDO from FDOFFSETX−FSTOP to FDOFFSETX+FSTOP (t8 to t9) for the detection of the levels of an output signal FDO at focus-on, and also outputs: a control signal for the switching circuit 28 to switch to the side of the adding circuit 35; and a control signal for the switching circuit 34 to switch to the side of the multiplication circuit 32. The adding circuit 35 outputs FDOF+FSTOP/128 data (=FDOFFSETX−FSTOP×127/128 data) obtained by adding FSTOP/128 data that is output from the multiplication circuit 32 to FDOF data (=FDOFFSETX−FSTOP data) retained by the register 30. Thus the FDOF data retained by the register 30 and the FOZ data retained by the register 36 become FDOF+FSTOP/128 data. The level of an output signal FDO of the DA converter 37 becomes FDOFF−SETX−FSTOP×127/128. Consequently, the position of the objective lens 4 in the focusing direction moves upward in FIG. 7.

By repeating the above process, the level of an output signal FDO reaches FDO(n) −α, a level at which an FE signal with an S-shape waveform reaches +FS_TH (t9). When detecting that an FE signal reaches +FS_TH based on a FINT signal from an AD converter 21 at that time, the control unit 59 detects whether or not the FINT signal (FE signal) becomes "0" again. That is, the control unit 59 detects the level of an output signal FDO at focus-on based on the state that an FE signal with an S-shape waveform reaches +FS_TH. When the level of an output signal FDO reaches FDO(n) by further repeating the above process (t10), an FINT signal (FE signal) becomes "0" again. The control unit 59 outputs a focus-on detection signal with a high level to the OR circuit 58 and the microcomputer 14 (t10), when detecting that an FINT signal (FE signal) becomes "0" again. Consequently, the OR circuit 58 outputs an end signal with a high level to the control unit 59 and the microcomputer 14 (t10). The control unit 59 outputs a control signal for opening the switch circuit 29 according to the end signal with a high level. Consequently, the FDOF data retained by the register 30 and the FOZ data retained by the register 36 are retained as FDO(n) invariantly, and the level of an output signal FDO of the DA converter 37 stays at an FDO(n) level (t10 or later). Thus the position of the objective lens 4 in the focusing direction is held at the broken line position shown in FIG. 7, which is a focus-on position. Even in the case that an FE signal with an S-shape waveform does not reach −FS_TH (and/or +FS_TH) due to the generation of noise component etc. in an FE signal, the level of an output signal FDO at focus-on can be detected by repeating focus-on search as described above.

According to an embodiment described above, FOZ data (=VREF data) retained by the register 36 can be set as an initial data for driving the focus actuator 5 at the beginning of the detection of the position of the objective lens 4 where laser beam is focused on an information recording surface, and such detection is enabled by setting as an initial position the thick solid line position indicated by the initial data of the objective lens 4. As a result, it is possible to avoid an abrupt change of the position of the objective lens 4 from the thick solid line position, and thus to prevent generation of vibration of the objective lens 4. Therefore, it is possible that the focus actuator 5 responds to the level of an output signal FDO in satisfactory condition, and it is also possible to prevent a prolonged period for the detection of the position of the objective lens 4 where laser beam is focused on an information recording surface.

By setting FOZ data retained by the register 36 as an initial data, and then varying the FOZ data, the objective lens 4 can be moved in the focusing direction between a dot-dashed line position and a double-dot-dashed line position alternately, and therefore it is possible to precisely detect the position of the objective lens 4 where the laser beam is focused on the information recording surface.

When the position of the objective lens 4 is the dot-dashed line position or double-dot-dashed line position, it is possible to stop varying FOZ data retained by the register 36 by opening the switch circuit 29 by the control unit 59. Consequently, the objective lens 4 can start moving from the dot-dashed line position or the double-dot-dashed line position on the detection of the position of the objective lens 4 where the laser beam is focused on the information recording surface, and therefore it is possible to shorten a period required for such detection. Specifically describing with comparing FIG. 4 and FIG. 6, in a conventional focus servo apparatus, the fruitless search and the focus-on search of focus search are ended by setting the level of an output signal FDO at FDOFFSETX. Therefore, in the case that focus-on search is started after the end of the fruitless search, for example, it takes time to decrease the level of the output signal FDO from FDOFF−SETX to FDOFFSETX−FSTOP as shown between t14 and t15 in FIG. 6. That is, in a conventional focus servo apparatus, since it is impossible to hold the level of an output signal FDO at FDOFFSETX−FSTOP or FDOFFSETX+FSTOP in order to maintain a state to hold the position of the objective lens 4 at the dot-dashed line position or the double-dot-dashed line position, a period required for focus search may be prolonged. In contrast, in the focus servo apparatus 15 according to an embodiment of the present invention, it is possible: to stop varying FOZ data retained by the register 36 when the objective lens 4 is positioned at the dot-dashed line position or the double-dot-dashed line position; and to shorten a period of detecting the position of the objective lens 4 where the laser beam is focused on the information recording surface, as it is discernible by comparison of FIG. 4 with FIG. 6.

In the case that the objective lens 4 is at the dot-dashed line position or the double-dot-dashed line position, and that the position of the objective lens 4 is detected where the laser beam is focused on the information recording surface, FOZ data (FDOFFSETX−FSTOP data or FDOFFSETX+FSTOP data) retained by the register 36 can be utilized as data for driving the focus actuator 5. Also in the above case, the above detection can be performed more precisely and also in a shorter period, by setting the position of the objective lens 4 (dot-dashed line position or double-dot-dashed line position), which is indicated by the above data for driving the focus actuator 5, as the initial position.

Moreover, the objective lens 4 can be moved, by the focus actuator 5, in a range between the double-dot-dashed line position, which is the closest position of the objective lens 4 to the optical disc 120, and the dot-dashed line position, which is the furthest position of the objective lens 4 from the optical disc 120, and thus the position of the objective lens 4 where the laser beam is focused on the information recording surface can be detected more precisely.

By adding: FDOF data retained by the register 30, which is the data equivalent to FOZ data retained by the register 36; to −FDOFFSETX data from the multiplication circuit 38 at the adding circuit 39, and by adding FDOF−FDOFFSETX data either to FSTOP data from the multiplication circuit 43 or to −FSTOP data from the multiplication circuit 44 corresponding to either "negative" or "positive" FDOF−FDOFFSETX data respectively at the adding circuit 45, it is possible to certainly determine whether the register 36 retains FDOFFSETX+FSTOP data or FDOFFSETX−FSTOP data.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A focus servo apparatus for an optical disc apparatus that includes an objective lens to converge laser beam on an information recording surface of an optical disc, and an actuator to move the objective lens across the information recording surface of the optical disc, in a focusing direction, between a first predetermined position and a second predetermined position, the focus servo apparatus comprising:

a retaining unit configured to retain control data that is used for driving the actuator;

a varying unit configured to vary control data;

a setting unit configured to cause the retaining unit to retain control data as initial data for driving the actuator and, subsequently, to cause the retaining unit to retain control data that has been varied by the varying unit, to thereby detect a target position of the objective lens where the laser beam is focused on the information recording surface, when the laser beam is not focused on the information recording surface, by moving the objective lens between the first predetermined position and the second predetermined position;

a detecting unit configured to detect whether the control data retained by the retaining unit is first control data corresponding to the first predetermined position or second control data corresponding to the second predetermined position, wherein the detecting unit further includes:

a first subtracting unit configured to perform a subtraction of the control data retained by the retaining unit and the first control data;

a first determining unit configured to determine whether an output of the first subtracting unit is zero;

a second subtracting unit configured to perform a subtraction of the control data retained by the retaining unit and the second control data; and a second determining unit configured to determine whether an output of the second subtracting unit is zero, wherein:

the detecting unit outputs a result of detection indicating that the control data retained by the retaining unit is the first control data, based on a result of determination of the first determining unit indicating that the output of the first subtracting unit is zero, and wherein the detecting unit outputs a result of detection indicating that the control data retained by the retaining unit is the second control data, based on a result of determination of the second determining unit indicating that the output of the second subtracting unit is zero; and a control unit configured to stop varying the control data retained by the retaining unit to detect the target position based on a result of detection by the detecting unit indicating that the control data retained by the retaining unit is the first control data or the second control data.

2. The focus servo apparatus of claim 1, wherein in the case of driving the actuator to detect the target position after the detecting unit detecting the result of the detection, the setting unit sets the first control data or the second control data retained by the retaining unit as data for driving the actuator, and the control unit permits the control data retained by the retaining unit to be varied.

3. The focus servo apparatus of claim 1, wherein the first predetermined position is the closest position of the objective lens to the optical disc in the focusing direction in a range where the objective lens can be moved by the actuator, and wherein the second predetermined position is the furthest position of the objective lens from the optical disc in the focusing direction in a range where the objective lens can be moved by the actuator.

* * * * *